(12) United States Patent
Kittaka et al.

(10) Patent No.: US 10,648,559 B2
(45) Date of Patent: May 12, 2020

(54) TRANSMISSION SYSTEM FOR VEHICLE

(71) Applicant: HONDA MOTOR CO., LTD., Tokyo (JP)

(72) Inventors: Eiji Kittaka, Wako (JP); Takashi Kudo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 571 days.

(21) Appl. No.: 15/430,924

(22) Filed: Feb. 13, 2017

(65) Prior Publication Data

US 2017/0254414 A1 Sep. 7, 2017

(30) Foreign Application Priority Data

Mar. 2, 2016 (JP) ................. 2016-039593

(51) Int. Cl.
| | |
|---|---|
| F16H 3/00 | (2006.01) |
| F16H 3/089 | (2006.01) |
| F16H 61/04 | (2006.01) |
| F16H 61/688 | (2006.01) |
| F16H 63/18 | (2006.01) |

(52) U.S. Cl.
CPC .......... *F16H 61/688* (2013.01); *F16H 3/006* (2013.01); *F16H 3/089* (2013.01); *F16H 61/0437* (2013.01); *F16H 63/18* (2013.01); *B60Y 2200/12* (2013.01); *B60Y 2400/421* (2013.01); *F16H 2061/0474* (2013.01); *F16H 2200/0052* (2013.01); *F16H 2306/46* (2013.01)

(58) Field of Classification Search
CPC .......... F16H 3/0915; F16H 3/006; F16H 3/10; F16H 61/16; F16H 2306/46

USPC .................................. 74/330, 335
See application file for complete search history.

(56) References Cited

U.S. PATENT DOCUMENTS

| | | | | |
|---|---|---|---|---|
| 8,402,859 B2* | 3/2013 | Neelakantan | ........... | F16H 63/18 74/337.5 |
| 8,433,489 B2* | 4/2013 | Arai | ...................... | B60W 10/02 477/175 |
| 8,479,903 B2* | 7/2013 | Yagi | .................... | F16D 48/0206 192/3.58 |
| 2002/0152823 A1* | 10/2002 | Wild | ................... | F16H 61/2807 74/335 |
| 2008/0023291 A1* | 1/2008 | Sorani | ................... | F02B 61/045 192/48.614 |
| 2008/0220936 A1* | 9/2008 | Kobayashi | ............ | B60W 10/02 477/70 |
| 2008/0236316 A1* | 10/2008 | Mizuno | ................... | F16H 63/18 74/335 |

FOREIGN PATENT DOCUMENTS

| | | |
|---|---|---|
| JP | 2011-017417 A | 1/2011 |
| JP | 4698367 B2 | 6/2011 |

* cited by examiner

*Primary Examiner* — Ha Dinh Ho
(74) *Attorney, Agent, or Firm* — Squire Patton Boggs (US) LLP (57) ABSTRACT

A transmission system for a vehicle has a shift driving mechanism which operates, under control by a control unit, at the time of shifting the gear position, to disengage a transmission gear of a current gear position and a shifter from each other after engaging a transmission gear of a next gear position and a shifter with each other in a condition where a transmission clutch that transmits power to the transmission gear of the next gear position is in an engaged state. This ensures smoother and swifter shifting of gear position.

12 Claims, 6 Drawing Sheets

TRANSMISSION SYSTEM FOR VEHICLE

TECHNICAL FIELD

The present invention relates to a transmission system for a vehicle, and, more particularly, to a transmission system mounted on a vehicle such as a motorcycle.

BACKGROUND ART

In a constant-mesh type gear transmission provided with a transmission clutch in a transmission system for a vehicle, one gear position is established through a process in which a shifter supported on a transmission shaft so as to be movable in the axial direction of the shaft engages with a transmission gear rotatably supported on the transmission shaft to thereby transmit power.

Shifting of gear position is performed through a process in which a transmission gear and a shifter for a current gear position are disengaged from each other and a transmission gear and a shifter for a next gear position are engaged with each other. In this case, the engagement between the transmission gear to which power has been transmitted and the shifter is so strong that a large resistance against disengagement is present because of friction between engaging portions of the transmission gear and the shifter that are pressed against each other. Ordinarily, therefore, a transmission clutch is disengaged to interrupt transmission of power, and, in this condition, the transmission gear and the shifter are disengaged from each other without resistance, whereby the gear position can be smoothly shifted (see, for example, Patent Document 1).

In addition, in the case of a transmission system including two transmission clutches (see, for example, Patent Document 2), shifting of gear position is conducted as follows. While a shifter is in engagement with a transmission gear of a current gear position, a shifter is engaged with a transmission gear of a next gear position, to establish a state in which the transmission gears of the current gear position and the next gear position are both in engagement with the shifters. In this state, the transmission clutch on one side that has been contributing to transmission of power to the transmission gear of the current gear position is disengaged, and the transmission clutch on the other side is engaged, to thereby switch over the power transmission to the next gear position. In this way, the shifter is easily disengaged from the transmission gear of the current gear position, which transmission gear is free from power transmission because of the disengaged associated transmission clutch. Thus, the next gear position is easily established.

PRIOR ART DOCUMENTS

Patent Documents

[Patent Document 1]
JP 2011-017417 A
[Patent Document 2]
JP 4 698 367 B

In the transmission system according to Patent Document 1 as well as in the transmission system according to Patent Document 2, disengagement of a transmission gear of a current gear position and a shifter from each other at the time of shifting a gear position is conducted after a transmission clutch, which has been transmitting power to the transmission gear of the current gear position is disengaged, and, by such a process, the shifter is easily disengaged from the transmission gear of the current gear position.

SUMMARY OF THE INVENTION

Problems to be Solved by the Invention

In order to easily disengage a shifter from a transmission gear of a current gear position in the prior art transmission system, it is necessary to start the operation of disengaging a transmission clutch for the current gear position at an appropriate timing prior to the movement of the shifter. For this reason, there is a limitation to shortening of the shifting time.

In addition, in the case where upshifts or downshifts are performed sequentially and continuously over a plurality of gear positions, it is necessary to disengage the transmission clutch each time of shifting the gear position, so that the transmission clutch is engaged and disengaged repeatedly. For this reason, it is difficult to achieve a smooth and swift shifting to a desired gear position.

The present invention has been made in consideration of the above-mentioned problems. Accordingly, it is an object of the present invention to provide a transmission system for a vehicle by which a shifter having been in engagement with a transmission gear of a current gear position can be easily disengaged, without preliminarily disengaging the transmission clutch for transmission of power to the transmission gear of the current gear position, so that the gear position can be shifted more smoothly and swiftly.

Means for Solving the Problems

In order to achieve the above object, according to the present invention, there is provided a transmission system for a vehicle, comprising: a transmission in which a plurality of driving transmission gears supported on a driving transmission shaft and a plurality of driven transmission gears supported on a driven transmission shaft are meshed on a gear position basis, and shifters supported on at least one transmission shaft out of the driving transmission shaft and the driven transmission shaft are movable in an axial direction of the transmission shaft for engagement with the transmission gears rotatably supported on the one transmission shaft to thereby enable transmission of power; a shift driving mechanism for moving the shifters to thereby shift a gear position of the transmission; and transmission clutches for establishing and interrupting transmission of power from a drive source to the driving transmission shaft:

wherein, for shifting the gear position, the shift driving mechanism and the transmission clutches are under control of a control unit operable by gear position shifting operation to disengage a shifter and a transmission gear of a current gear position from each other after engaging a shifter and a transmission gear of a next gear position with each other, in a condition where one of the transmission clutches for transmitting power to the transmission gear of the next gear position is in an engaged state.

According to this configuration, when the shifter is engaged, for gear position shift, with the transmission gear of the next gear position in a condition where the transmission clutch for transmission of power to the transmission gear of the next gear position is in an engaged state, contact shock on the shifter due to the engagement thereof is transmitted through the transmission shaft to the shifter of the current gear position, to loosen the engagement of this shifter with the transmission gear of the current gear position, making movement of this shifter easy. Therefore, the shifter and the transmission gear of the current gear position can thereafter be easily disengaged from each other.

In other words, the shifter and the transmission gear of the current gear position can be smoothly disengaged from each other, without preliminarily disengaging the transmission clutch for the current gear position. Accordingly, a smoother and swifter shifting of the gear position can be achieved.

In addition, in the case where upshifts or downshifts are performed sequentially and continuously over a plurality of gear positions, the gear positions can be sequentially shifted while the transmission clutch for the current gear position and the transmission clutch for the next gear position are both kept in an engaged state, without preliminarily disengaging the transmission clutch each time the gear position is shifted. Consequently, a smooth and swift shifting to the desired gear position can be performed.

Note that here, the shifter may be a shifter gear that functions also as a transmission gear.

The transmission system for the vehicle as above may have a configuration wherein the shift driving mechanism comprises a rotatable shift drum having lead grooves formed in an outer circumferential surface thereof, and shift forks movable in an axial direction of the shift drum while being guided by lead grooves, the shift forks being in engagement with the shifters, respectively, to shift the shifters and being sequentially movable, always in a pair, in an upshift direction or a downshift direction to thereby shift the gear position; and the shift drum is formed in such a manner that a starting timing of shifting set by the lead groove for a next gear position is earlier than a starting timing of shifting set by the lead groove for a current gear position.

According to this configuration, the shift driving mechanism is a mechanism in which shift forks moved in an axial direction while being guided by lead grooves formed in an outer circumferential surface of a shift drum by rotation of the shift drum are sequentially moved, always in a pair, in an upshift direction or a downshift direction to thereby operate the shifters. In addition, the shift drum is formed in such a manner that a starting timing of shifting by the lead groove for the next gear position is earlier than a starting timing of shifting by the lead groove for the current gear position. Therefore, the lead grooves can be formed in the outer circumferential surface of the shift drum in such a manner that at the time of shifting the gear position, the shifter is disengaged from the transmission gear of the current gear position after the shifter is engaged with the transmission gear of the next gear position.

By using such a shift drum as above, the shifter can be engaged with and disengaged from the transmission gear with a simple-structured shift driving mechanism, at an appropriate timing and in a reliable manner.

The transmission system for the vehicle as above may have a configuration wherein each of the transmission clutches is provided for each gear position or for each of gear position groups, and at the time of shifting the gear position, while one of the transmission clutches which has been transmitting power to the transmission gear of the current gear position is kept in an engaged state, another transmission clutch which is to transmit power to the transmission gear of the next gear position is concurrently engaged.

According to this configuration, the transmission clutches are each provided on a gear position basis or a gear position group basis. In addition, at the time of shifting the gear position, while the transmission clutch that transmits power to the transmission gear of the current gear position is kept in an engaged state, the transmission clutch that transmits power to the transmission gear of the next gear position is engaged at the same time. By this, the shifter is easily disengaged from the transmission gear of the current gear position, so that a smooth and swift shifting of the gear position can be achieved.

The transmission system for the vehicle as above may have a configuration wherein the transmission clutches are provided respectively for two groups consisting of a group of odd-numbered gear positions and a group of even-numbered gear positions, and at the time of shifting the gear position, while one of the transmission clutches that transmits power to the transmission gear of the current gear position is kept in an engaged state, the other of the transmission clutches that transmits power to the transmission gear of the next gear position is concurrently engaged.

According to this configuration, the shift clutches are each provided for two groups consisting of a group of odd-numbered gear positions and a group of even-numbered gear positions. In addition, at the time of shifting the gear position, while the transmission clutch on one side that transmits power to the transmission gear of the current gear position is kept in an engaged state, the transmission clutch on the other side that transmits power to the transmission gear of the next gear position is engaged at the same time. By this, the shifter is easily disengaged from the transmission gear of the current gear position, so that a smooth and swift shifting of the gear position can be accomplished.

In the transmission system for the vehicle as above, the shift clutches may be capable of capacity control.

According to this configuration, the transmission clutches are, for example, hydraulic clutches capable of capacity control. Therefore, shocks upon engagement of the shifter with the transmission gear can be absorbed, so that engaging noise can be reduced.

Effect of the Invention

According to the present invention, at the time of shifting a gear position, disengagement of a shifter from a transmission gear of a current gear position is conducted after a transmission clutch for transmission of power to a transmission gear of a next gear position is put into an engaged state and engagement of a shifter with the transmission gear of the next gear position is started. Therefore, at the time of shifting the gear position, when the transmission clutch is put into an engaged state and the shifter starts engaging with the transmission gear of the next gear position to which power is to be transmitted, the contact movement of the shifter due to its engagement is transmitted through a transmission shaft to the shifter of the current gear position, to loosen the engagement of this shifter with the transmission gear of the current gear position, thus permitting free movement of this shifter. Consequently, this shifter is easily disengaged from the transmission gear of the current gear position.

In other words, the shifter can be disengaged from the transmission gear of the current gear position without preliminarily disengaging the transmission clutch for the current gear position. Accordingly, a smoother and swifter shifting of the gear position can be accomplished.

In addition, in the case where upshifts or downshifts are conducted sequentially and continuously over a plurality of gear positions, shifts of the gear position can be sequentially performed while the transmission clutch for the current gear position and the transmission clutch for the next gear position are both kept in an engaged state, without disengaging the transmission clutches each time of shifting the gear position. Consequently, a smooth and swift shifting to a desired gear position can be achieved.

MODE FOR CARRYING OUT THE INVENTION

An embodiment of the present invention will be described below with reference to the drawings.

An internal combustion engine 1 provided with a transmission system for a vehicle according to one embodiment of the present invention is a two-cylinder four-stroke-cycle internal combustion engine, and is mounted on a small vehicle such as a motorcycle in a transverse mounting mode, with a crankshaft oriented in a transverse direction of the vehicle.

Note that in the description herein, the directions, such as forward, rearward, leftward and rightward directions, accord to the ordinary standard in which the straight forward travelling direction of the vehicle according to this embodiment is the forward direction. In the drawings, FR indicates the front side, RR the rear side, LH the left-hand side, and RH the right-hand side.

Figure 1:
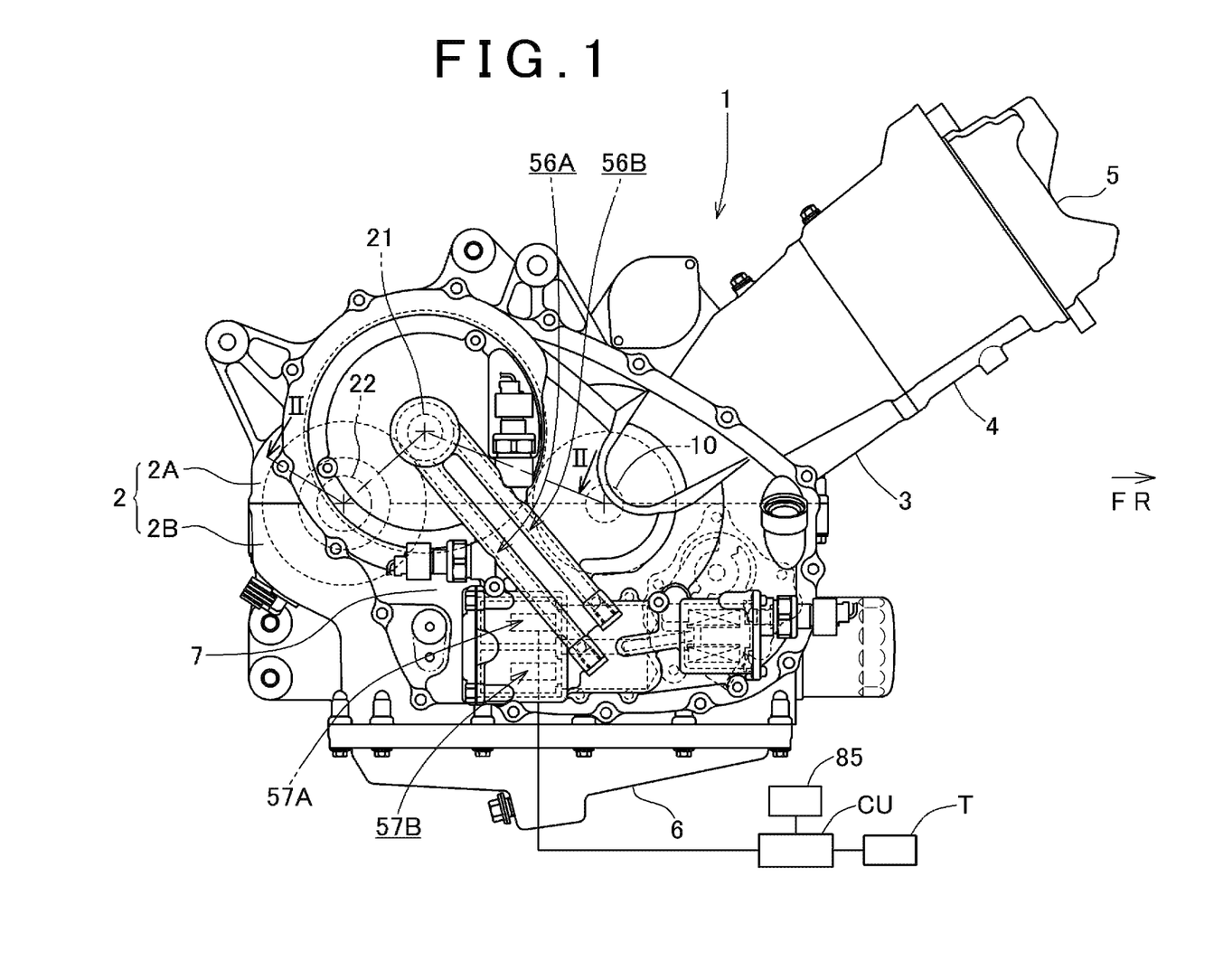
FIG. 1 is a right side view of an internal combustion engine provided with a transmission system for a vehicle according to an embodiment of the present invention.

FIG. 1 is a right side view of the internal combustion engine 1.

A crankshaft 10 oriented in the left-right direction, or the transverse direction of the vehicle, is situated between an upper crankcase section 2A and a lower crankcase section 2B (into which a crankcase 2 is divided to the upper and lower sides) through bearings, and is thereby supported in a rotatable manner.

A cylinder block 3, a cylinder head 4, and a cylinder head cover 5 are sequentially and fixedly laid one upon another to project obliquely forward and upward from the upper crankcase section 2A.

The lower side of the lower crankcase section 2B is closed with an oil pan 6.

The crankcase 2 consisting of the upper crankcase section 2A and the lower crankcase section 2B has a transmission 20 integrally incorporated therein.

Figure 2:
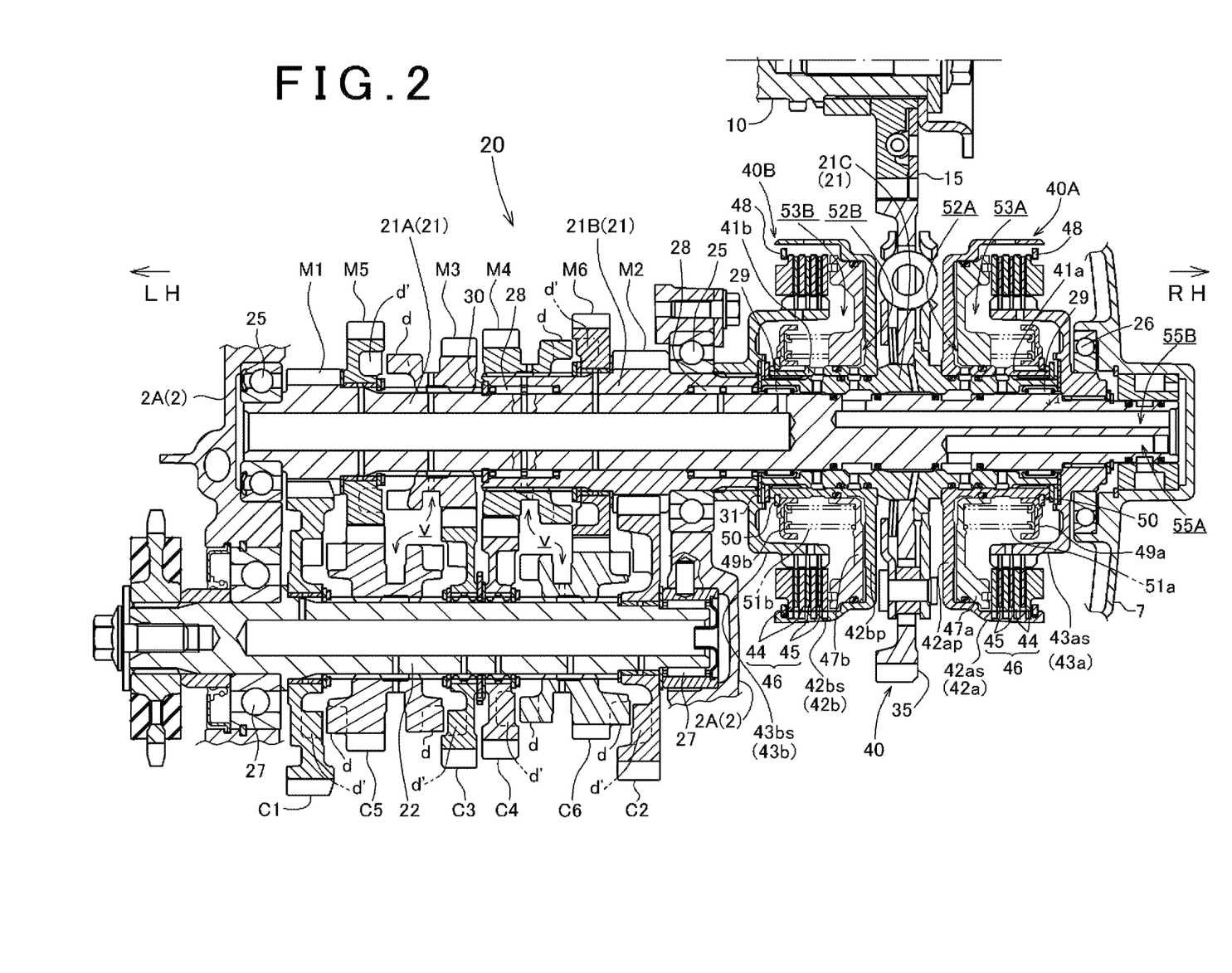
FIG. 2 is a sectional development of the vicinity of a transmission, as viewed along arrow II-II in FIG. 1.

FIG. 2 is a sectional development of the vicinity of the transmission 20, as viewed along arrow II-II in FIG. 1.

The transmission 20 is a constant-mesh type transmission in which first-speed to sixth-speed driving gears M1 to M6 supported on a main shaft 21, as a driving transmission shaft, and first-speed to sixth-speed driven gears C1 to C6 supported on a counter shaft 22, as a driven transmission shaft, are constantly meshed with each other, individually.

The main shaft 21 is rotatably mounted on the upper crankcase section 2A through bearings 25 and 25, at a position rearward of and on a slightly obliquely upper side of the crankshaft 10, in parallel to the crankshaft 10 (see FIGS. 1 and 2).

The right end of the main shaft 21 is rotatably supported on a right crankcase cover 7 through a bearing 26.

At a position on an obliquely rear and lower side of the main shaft 21, the counter shaft 22 serving as an output shaft of the internal combustion engine 1 is rotatably supported between the upper crankcase section 2A and the lower crankcase section 2B through bearings 27 and 27, in parallel to the main shaft 21 (see FIGS. 1 and 2).

The main shaft 21 is composed of a long main-shaft inner shaft 21A, a short main-shaft outer shaft 21B, and a clutch-section outer shaft 21C.

The main-shaft outer shaft 21B is externally fitted on a part of the main-shaft inner shaft 21A in a relatively rotatable manner through needle bearings 28 and 28. The clutch-section outer shaft 21C is externally fitted on the main-shaft inner shaft 41A, on the right side of the main-shaft outer shaft 21B, in a relatively rotatable manner through needle bearings 29 and 29.

The left end of the main-shaft outer shaft 21B is restricted in leftward movement by a C-shaped stop ring 30.

The right end of the main-shaft outer shaft 21B abuts on the clutch-section outer shaft 21C through an annular spacer 31, and is thereby restricted in rightward movement.

The odd-numbered gear position driving gears M1, M5, and M3 are supported on that portion of the main-shaft inner shaft 21A which extends leftward beyond the main-shaft outer shaft 21B, and the even-numbered gear position driving gears M4, M6, and M2 are supported on the main-shaft outer shaft 21B, on the right side of the odd-numbered gear position driving gears M1, M5, and M3.

The left end of the main-shaft inner shaft 21A and a right side portion of the main-shaft outer shaft 21B are mounted, respectively, on the upper crankcase section 2A through the above-mentioned bearings 25 and 25.

That portion of the main-shaft inner shaft 21A which extends rightward beyond the main-shaft outer shaft 21B protrudes rightward beyond a right side wall of the crankcase 2. The clutch-section outer shaft 21C is externally fitted on this right side portion of the main-shaft inner shaft 21A in a relatively rotatable manner through the above-mentioned needle bearings 29 and 29.

A primary driven gear 35 is fitted to an axially central portion with respect to the left-right length of the clutch-section outer shaft 21C.

On the other hand, a primary driving gear 15 fitted to the right end of the crankshaft 10 is in mesh with the primary driven gear 35. Rotation of the crankshaft 10 is transmitted through the meshing of the primary driving gear 15 and the primary driven gear 35 to the clutch-section outer shaft 21C on the main shaft 21, to thereby rotate the clutch-section outer shaft 21C.

A first transmission clutch 40A and a second transmission clutch 40B are arranged on the clutch-section outer shaft 21C, respectively, on the right and left sides of the primary driven gear 35. The first and second clutch 40A and 40B constitute a twin clutch 40. These clutch 40A and 40B are hydraulic clutches capable of capacity control, in the embodiment illustrated.

The pair of clutches 40A and 40B constituting the twin clutch 40 are both a hydraulic-type multiple disc clutch.

Clutch hubs 41a and 41b are splined to the clutch-section outer shaft 21C, on both sides of a center position where the primary driven gear 35 is fitted.

Clutch outer members 42a and 42b of the first clutch 40A and the second clutch 40B are welded to those end portions of the clutch hubs 41a and 41b which are adjacent to the primary driven gear 35.

Therefore, the clutch outer members 42a and 42b are rotated integrally with the primary driven gear 35 through the clutch hubs 41a and 41b.

A clutch inner member 43a of the first clutch 40A is splined to a right end of the main-shaft inner shaft 21A, and is rotated as one body with the main-shaft inner shaft 21A.

A clutch inner member 43b of the second clutch 40B is splined to a right end of the main-shaft outer shaft 21B, and is rotated as one body with the main-shaft outer shaft 21B.

On the inside of hollow cylindrical portions 42as and 42bs of the clutch outer members 42a and 42b of the pair of clutches 40A and 40B, there are provided pluralities of driving friction discs 44 which are engaged with the clutch outer members 42a and 42b to be relatively non-rotatable and movable in the axial direction.

On the outside of hollow cylindrical portions 43as and 43bs of the clutch inner members 43a and 43b of the pair of clutches 40A and 40B, there are provided pluralities of driven friction discs 45 which are engaged with the clutch inner members 43a and 43b to be relatively non-rotatable and movable in the axial direction.

The driving friction discs 44 and the driven friction discs 45 are alternately disposed to constitute a friction disc group 46.

Pressure plates 47a and 47b movable in the axial direction between end plate portions 42ap and 42bp of the clutch outer members 42a and 42b of the clutches 40A and 40B and the friction disc groups 46 and 46 are slidably supported on the clutch hubs 41a and 41b.

The driving friction disc 44 at the outermost end of each of the friction disc group 46 is restricted in movement through a C-shaped stop ring 48.

On the inside of the hollow cylindrical portions 43as and 43bs of the clutch inner members 43a and 43b, spring retainers 49a and 49b are provided on the clutch hubs 41a and 41b in the state of being restricted in movement by C-shaped stop rings 50 and 50.

Clutch springs 51a and 51b are interposed between the pressure plates 47a and 47b and the spring retainers 49a and 49b.

Control oil pressure chambers 52A and 52B and canceler oil chambers 53A and 53B are formed on both sides, with respect to the axial direction, of the pressure plates 47a and 47b.

The control oil pressure chambers 52A and 52B are individually formed between the end plate portions 42ap and 42bp of the clutch outers 42a and 42b and the pressure plates 47a and 47b, whereas the canceler oil chambers 53A and 53B are formed between the pressure plates 47a and 47b and the clutch inners 43a and 43b.

The main-shaft inner shaft 21A is formed therein with a first control oil hole 55A and a second control oil hole 55B which are bored leftward from the right end portion of the main-shaft inner shaft 21A. The first control oil hole 55A communicates with the control oil pressure chamber 52A, whereas the second control oil hole 55B communicates with the control oil pressure chamber 52B.

The first control oil hole 55A is supplied with a hydraulic oil from a first clutch actuator 57A (FIG. 1) through a first control oil passage 56A, whereas the second control oil hole 55B is supplied with a hydraulic oil from a second clutch actuator 57B (FIG. 1) through a second control oil passage 56B.

Therefore, by operating the first clutch actuator 57A, a working oil in a controlled state is supplied through the first control oil passage 56A and the first control oil hole 55A into the control oil pressure chamber 52A of the first clutch 40A, to thereby engage or disengage the first clutch 40A. Similarly, by operating the second clutch actuator 57B, a working oil in a controlled state is supplied through the second control oil passage 56B and the second control oil hole 55B into the control oil pressure chamber 52B of the second clutch 40B, to thereby engage or disengage the second clutch 40B. Timings at which the first and second clutch actuators 57A and 57B are operated and unoperated are controlled and determined by a controller CT shown in FIG. 1.

In a condition where rotation of the crankshaft is transmitted through the meshing of the primary driving gear 15 with the primary driven gear 35 to the clutch-section outer shaft 21C on the main shaft 21 and where both the clutch outer member 42a of the first clutch 40A and the clutch outer member 42b of the second clutch 40B are being rotated through the clutch section-outer shaft 21C, engagement of the first clutch 40A causes power to be transmitted to the main-shaft inner shaft 21A to rotate the same, whereas engagement of the second clutch 40B causes power to be transmitted to the main-shaft outer shaft 21B to rotate the same.

Referring to FIG. 2, the first-speed driving gear M1, the fifth-speed driving gear M5, and the third-speed driving gear M3 for odd-numbered gear positions are supported on the main-shaft inner shaft 21A in this order from the left side toward the right side. The fourth-speed driving gear M4, the sixth-speed driving gear M6, and the second-speed driving gear M2 for even-numbered gear positions are supported on the main-shaft outer shaft 21B, on the right side of the driving gears M1, M5, and M3 for odd-numbered gear positions, in this order from the left side toward the right side.

On the other hand, the first-speed driven gear C1, the fifth-speed driven gear C5, the third-speed driven gear C3, the fourth-speed driven gear C4, the sixth-speed driven gear C6, and the second-speed driven gear C2 are supported on the counter shaft 22 in this order from the left side toward the right side, so as to correspond to and mesh with the driving gears M1, M5, M3, M4, M6, and M2, respectively.

Among the driving gears M1 to M6, the first-speed driving gear M1 and the second-speed driving gear M2 are fixed gears which are formed integrally with the main shaft 21, the fifth-speed driving gear M5 and the sixth-speed driving gear M6 are idle gears which are rotatably supported at axially fixed positions on the main shaft 21, and the third-speed driving gear M3 and the fourth-speed driving gear M4 are shifters or shifter gears which are non-rotatable and slidable in the axial direction in relation to the main shaft 21.

The third-speed driving gear M3 and the fourth-speed driving gear M4, as shifters or shifter gears, each have an engaging groove v for engagement with a shift fork (described later) and dog teeth d. When the third-speed driving gear M3 is slid leftward, its dog teeth d engage with dog teeth d' of the fifth-speed driving gear M5 (which is an idle gear), to thereby rotate the fifth-speed driving gear M5. When the fourth-speed driving gear M4 is slid rightward, its dog teeth d engage with dog teeth d' of the sixth-speed driving gear M6 (which is an idle gear), to thereby rotate the sixth-speed driving gear M6.

Among the driven gears C1 to C6, the first-speed driven gear C1, the second-speed driven gear C2, the third-speed driven gear C3 and the fourth-speed driven gear C4 are idle gears which are rotatably supported at axially fixed positions on the counter shaft 22, while the fifth-speed driven gear C5 and the sixth-speed driven gear C6 are shifter gears which are non-rotatable and slidable in the axial direction in relation to the counter shaft 22.

The fifth-speed driven gear C5 and the sixth-speed driven gear C6 as shifter gears each have an engaging groove v for engagement with a shift fork, and dog teeth d on both left and right sides thereof. When the fifth-speed driven gear C5 is slid leftward from a neutral position, its dog teeth d engage with dog teeth d' of the first-speed driven gear C1, so that both the driven gears C5 and C1 will rotate together, and when the fifth-driven gear C5 is slid rightward from the neutral position, its dog teeth d engage with dog teeth d' of the third-speed driven gear C3, so that both the driven gears C5 and C3 will rotate together. When the sixth-speed driven gear C6 is slid leftward from a neutral position, its dog teeth d engage with dog teeth d' of the fourth-speed driven gear C4, so that both the driven gears C6 and C4 will rotate together, and when the sixth-speed driven gear C6 is slid rightward from the neutral position, its dog teeth d engage with dog teeth d' of the second-speed driven gear C2, so that both the driven gears C6 and C2 will rotate together.

Therefore, when the fifth-speed driven gear C5 is slid leftward from the neutral position and its dog teeth d engage with the dog teeth d' of the first-speed driven gear C1, the meshing of the first-speed driving gear M1 and the first-speed driven gear C1 causes power to be effectively transmitted from the main-shaft inner shaft 21A to the counter shaft 22, establishing a first-speed gear position.

Similarly, when the sixth-speed driven gear C6 is slid rightward from the neutral position to engage with the second-speed driven gear C2, a second-speed gear position is established. When the fifth-speed driven gear C5 is slid rightward from the neutral position to engage with the third-speed driven gear C3, a third-speed gear position is established. When the sixth-speed driven gear C6 is slid leftward from the neutral position to engage with the fourth-speed driven gear C4, a fourth-speed gear position is established. When the third-speed driving gear M3 is slid leftward to engage with the fifth-speed driving gear M5, a fifth-speed gear position is established. When the fourth-speed driving gear M4 is slid rightward to engage with the sixth-speed driving gear M6, a sixth-speed gear position is established.

A shift driving mechanism 60 that moves the shifter gears for shifting the gear position in the above-mentioned manner will be described below.

Figure 3:
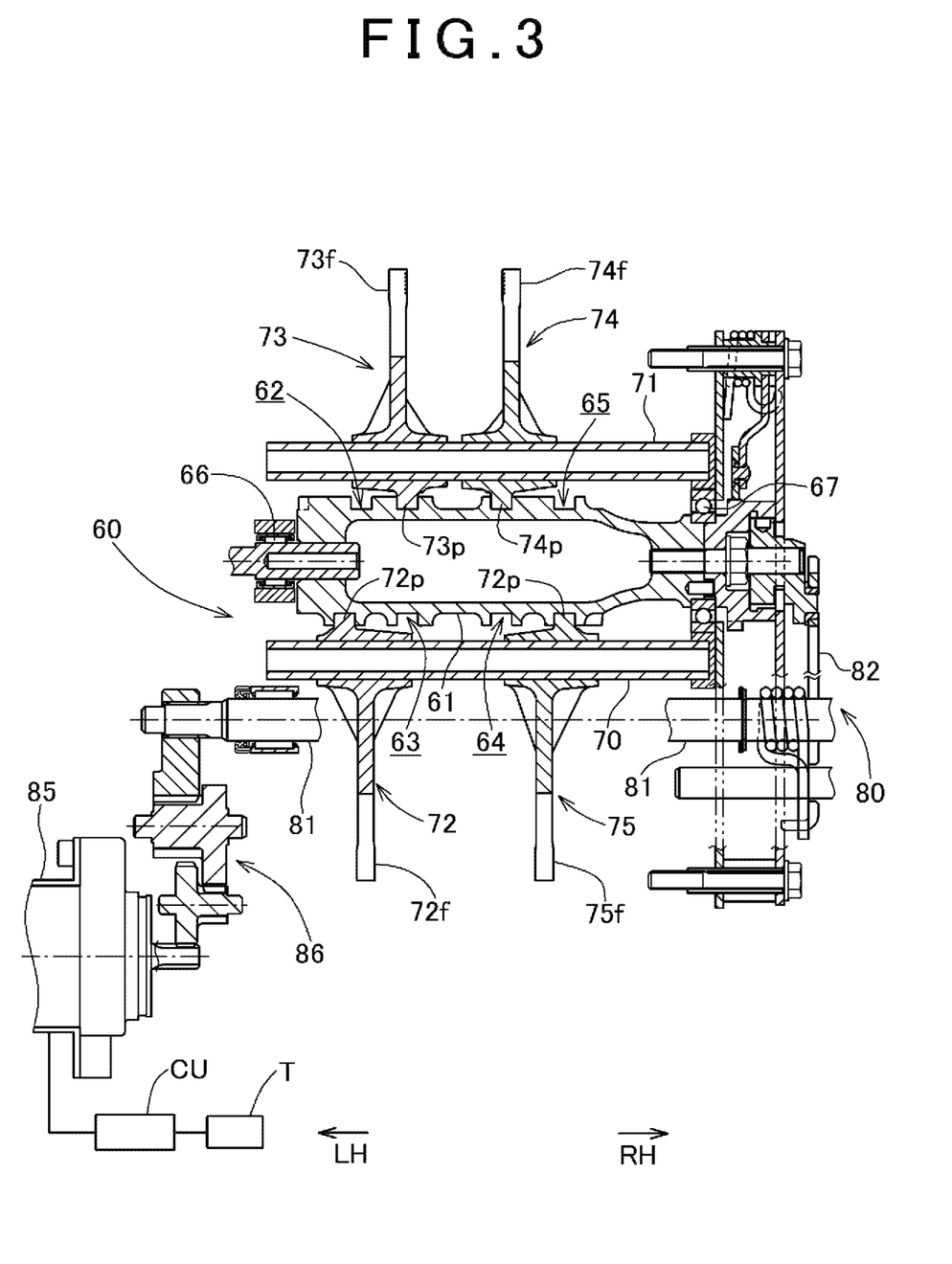
FIG. 3 is a developed sectional view of a shift driving mechanism.

As shown in FIG. 3, the shift driving mechanism 60 includes a shift drum 61 and four shift forks 72, 73, 74, and 75. With the shift drum 61 rotated, the shift forks 72, 73, 74, and 75 are moved in the axial direction of the shift drum 61 to slide the shifter gears via the shift forks, whereby the gear position of the transmission 20 is shifted.

The shift drum 61 is rotatably mounted on left and right side walls of the crankcase 2 through bearings 66 and 67. An outer circumferential surface of the shift drum 61 is formed with four lead grooves 62, 63, 64, and 65 which extend in the circumferential direction and are arranged in this order from the left side toward the right side.

Shift fork shafts 70 and 71 are arranged on the left and right side walls of the crankcase 2 in the vicinity of the shift drum 61, in parallel to a rotational center axis of the shift drum 61. The two shift forks 72 and 75 are supported on the shift fork shaft 70 so as to be movable in the axial direction. The two shift forks 73 and 74 are supported on the shift fork shaft 71 so as to be movable in the axial direction.

Among the shift fork 72, a fork portion 72f engages with the engaging groove v of the fifth-speed driven gear C5, and a pin portion 72p slidably engages with the lead groove 62 of the shift drum 61.

Among the shift fork 73, a fork portion 73f engages with the engaging groove v of the third-speed driving gear M3, and a pin portion 73p slidably engages with the lead groove 63 of the shift drum 61.

Among the shift fork 74, a fork portion 74f engages with the engaging groove v of the fourth-speed driving gear M4, and a pin portion 74p slidably engages with the lead groove 64 of the shift drum 61.

Among the shift fork 75, a fork portion 75f engages with the engaging groove v of the sixth-speed driven gear C6, and a pin portion 75p slidably engages with the lead groove 65 of the shift drum 61.

Therefore, when the shift drum 61 is rotated, the shift forks 72, 73, 74, and 75 are moved in the axial direction while being guided respectively by the lead grooves 62, 63, 64, and 65 to cause the fifth-speed driven gear C5, the third-speed driving gear M3, the fourth-speed driving gear M4, and the sixth-speed driven gear C6 (which are shifter gears) to slide in the axial direction, whereby shifting of the gear position is carried out.

The shift fork 72 can establish the first-speed gear position and the third-speed gear position by moving the fifth-speed driven gear C5 leftward and rightward, respectively; the shift fork 75 can establish the fourth-speed gear position and the second-speed gear position by moving the sixth-speed driven gear C6 leftward and rightward, respectively; the shift fork 73 can establish the fifth-speed gear position by moving the third-speed driving gear M3 leftward; and the shift fork 74 can establish the sixth-speed gear position by moving the fourth-speed driving gear M4 rightward.

At the right end portion 61a of the shift drum 61, there is provided an intermittent feeding mechanism that intermittently rotates the shift drum 61. The intermittent feeding mechanism 80 is actuated by oscillation of a master arm 82 fitted to a shift spindle 81.

The shift spindle 81 is rotated by transmission of the driving rotation of a shift motor 85 through a speed reduction gear mechanism 86.

Therefore, with the shift motor 85 operated to rotate the shift spindle 81, the shift drum 61 is intermittently rotated through the intermittent feeding mechanism 80, whereby shifting of the gear position is performed.

Figure 4:
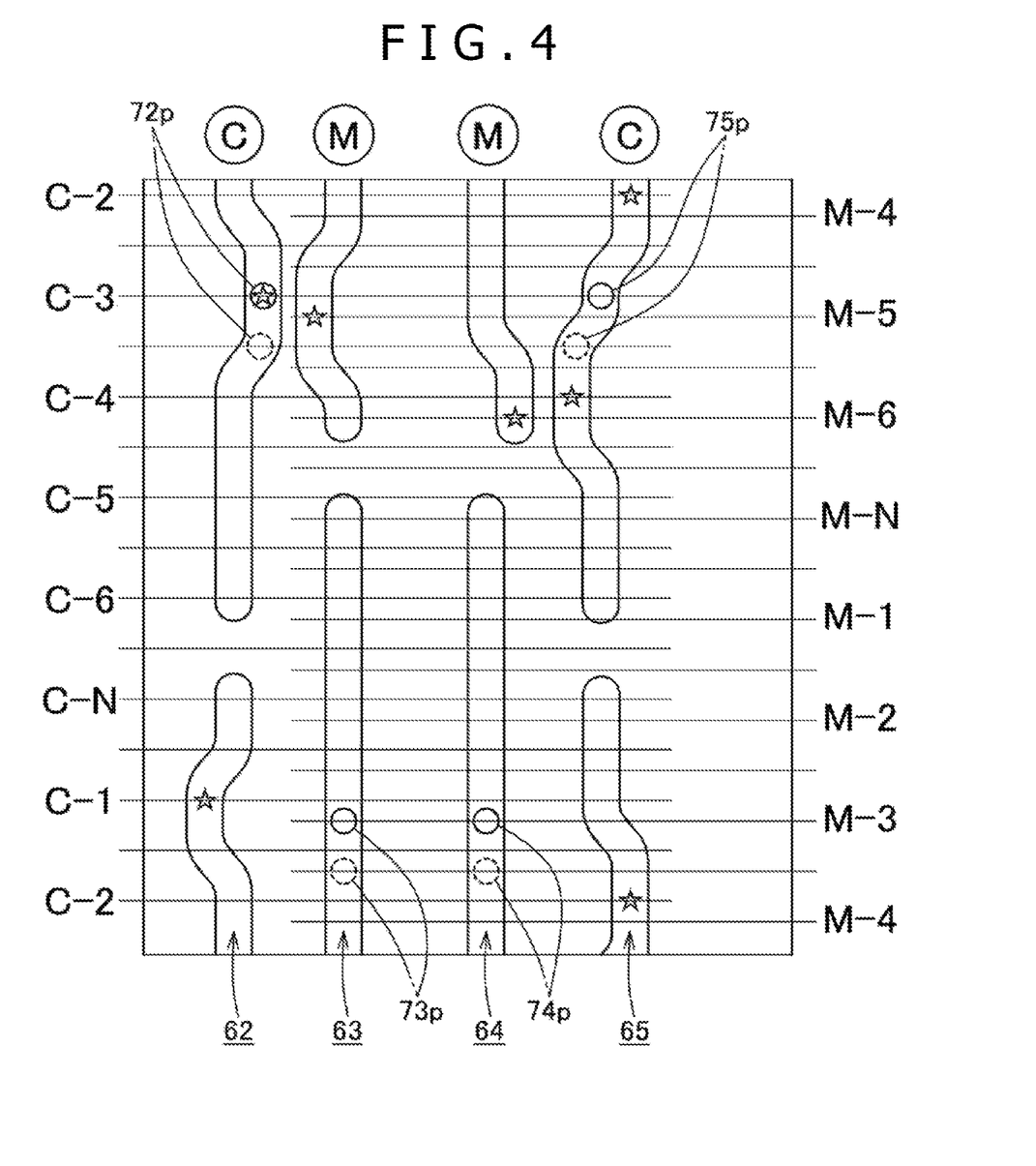
FIG. 4 is a development of an outer circumferential surface of a shift drum.

A development of the outer circumferential surface of the shift drum 61 formed with the four lead grooves 62, 63, 64, and 65 is shown in FIG. 4.

The pin portions 72p, 73p, 74p, and 75p of the shift forks 72, 73, 74, and 75 are in slidable engagement with the lead grooves 62, 63, 64, and 65, respectively.

The pin portion 72p of the shift fork 72 for moving the fifth-speed driven gear C5 on the counter shaft 22 is engaged with the lead groove 62; the pin portion 73p of the shift fork 73 for moving the third-speed driving gear M3 on the main-shaft inner shaft 21A is engaged with the lead groove 63; the pin portion 74p of the shift fork 74 for moving the fourth-speed driving gear M4 on the main-shaft outer shaft 21B is engaged with the lead groove 64; and the pin portion 75p of the shift fork 75 for moving the sixth-speed driven gear C6 on the counter shaft 22 is engaged with the lead groove 65.

The pin portion 72p of the shift fork 72 for the fifth-speed driven gear C5 and the pin portion 75p of the shift fork 75 for the sixth-speed driven gear C6 are located at the same rotational angle position of the shift drum 61, whereas the pin portion 73p of the shift fork 73 for the third-speed driving gear M3 and the pin portion 74p of the shift fork 74 for the fourth-speed driving gear M4 are located at the same rotational angle position of the shift drum 61.

The pin portions 72p and 75p of the shift forks 72 and 75 that move the fifth-speed driven gear C5 and the sixth-speed driven gear C6 on the counter shaft 22 are located at rotational angles denoted by C-1, C-2, C-3, C-4, C-5, C-6, and C-N on the basis of the first- to sixth-speed gear positions and a neutral position N. The pin portions 73p and 74p of the shift forks 73 and 74 that move the third-speed driving gear M3 and the fourth-speed driving gear M4 on the main shaft 21 are located at rotational angles denoted by M-1, M-2, M-3, M-4, M-5, M-6, and M-N on the basis of the first- to sixth-speed gear positions and the neutral position N.

In FIG. 4 showing a development of the outer circumferential surface of the shift drum 61, a star mark ☆ is given to each of positions in the lead groove 62 at which the pin portion 72p of the shift fork 72 establishes the first- and third-speed gear positions C-1 and C-3, to a position in the lead groove 63 at which the pin portion 73p of the shift fork 73 establishes the fifth-speed gear position M-5, to a position in the lead groove 64 at which the pin portion 74p of the shift fork 74 establishes the sixth-speed gear position M-6, and to positions in the lead groove 65 at which the pin portion 75p of the shift fork 75 establishes the second- and fourth-speed gear positions C-2 and C-5.

The lead grooves 62, 63, 64 and 65 of the shift drum 61 are formed to be rectilinear over a predetermined rotational angle (an angle corresponding approximately to a rotational angle between two adjoining gear positions, in the embodiment shown) in the vicinity, in the circumferential direction, of the positions of the star mark ☆ at which the gear positions are each established. The lead grooves 62, 63, 64 and 65 of the shift drum 61 have an angular range or ranges of non-shifting movement of the shifter gear in the vicinity, in the circumferential direction, of the ranges of the star mark ☆.

The lead groove, where the pin portion of the shift fork for establishing the next gear position to be obtained by a shift from the current gear position is located, is formed to have a bent portion with a slight angle in a rotational angle direction from the position at the time of the current gear position toward the position at the time of the next gear position, so that the pin portion immediately starts moving.

In the development of the shift drum 61 shown in FIG. 4, the positions of the pin portions 72p, 73p, 74p, and 75p of the shift forks 72, 73, 74, and 75 at the time when the third-speed gear position (M-3, C-3) is established, as an example, are indicated by a solid line circle mark ○.

Specifically, the pin portions 72p and 75p of the shift forks 72 and 75 are located at the angular positions C-3 for the third-speed gear position in the lead grooves 62 and 65, and the pin portions 73p and 74p of the shift forks 73 and 74 are located at the angular positions M-3 for the third-speed gear position in the lead grooves 63 and 64.

Considering the positions of the pin portions 72p, 73p, 74p, and 75p of the shift forks 72, 73, 74, and 75 at the time of the third-speed gear position (M-3, C-3), the pin portion 72p of the shift fork 72 in the lead groove 62 is located on the right side as compared to a neutral position, and coincides with the star mark ☆.

Specifically, the shift fork 72 moves the fifth-speed driven gear C5 rightward relative to a neutral position to engage the dog teeth d of the fifth-speed driven gear C5 with the dog teeth d' of the third-speed driven gear C3. By this, the power transmitted through the meshing between the third-speed driving gear M3 and the third-speed driven gear C3 is transmitted through the fifth-speed driven gear C5 to the counter shaft 22; thus, the third-speed gear position is established.

The pin portion 75p of the shift fork 75 (for the sixth-speed driven gear C6) in the lead groove 65 is in a neutral position as indicated by the solid line circle mark ○, and, therefore, the sixth-speed driven gear C6 is in engagement with neither of the fourth-speed driven gear C4 and the second-speed driven gear C2 which are located on both sides thereof.

The pin portion 73p of the shift fork 73 (for the third-speed driving gear M3) in the lead groove 63 is located on a right side as indicated by the solid line circle mark ○, and, accordingly, the third-speed driving gear M3 is not in engagement with the fifth-speed driving gear M5.

The pin portion 74p of the shift fork 74 (for the fourth-speed driving gear M4) in the lead groove 64 is located on a left side as indicated by the solid line circle mark ○, and, therefore, the fourth-speed driving gear M4 is not in engagement with the sixth-speed driving gear M6.

Referring to FIG. 4, the lead groove 62 is formed to be rectilinear over a predetermined rotational angle range from the position of the pin portion 72a of the shift fork 72 establishing the current third-speed gear position (the position of the star mark ☆ at the rotational angle C3 and also the position of the solid line circle mark ○) to the second-speed rotational angle C-2 and to the fourth-speed rotational angle C-4. Therefore, in this range (the range from the solid line circle mark ○ to a broken line circle mark in FIG. 4), the pin portion 72p is not moved in the leftward-rightward direction.

Referring to the range from the rotational angle C-3 to the fourth-speed rotational angle C-4 of the lead groove 62, the pin portion 72p is not moved in the leftward-rightward direction within the range from the solid line circle mark to the broken line circle mark in FIG. 4.

On the other hand, the pin portion 75p of the shift fork 75 (for the sixth-speed driven gear C6) for establishing the next second- or fourth-speed gear position is located at the position of the rotational angle C-3 in the lead groove 65 (the position of the solid line circle mark ○). Here, the lead groove 65 is formed to have a bent portion at a slight angle from this position toward the side of the second-speed rotational angle C-2 and toward the side of the fourth-speed rotational angle C-4. Therefore, the pin portion 75p immediately starts moving, and continues moving to a predetermined rotational angle position (the terminal end position of the rectilinearly formed portion of the lead groove 62) of the pin portion 72p of the shift fork 72 establishing the current third-speed gear position, to thus reach the vicinity of the position for establishing the next gear position (to reach the position of the broken line circle mark in FIG. 4).

Figure 5:
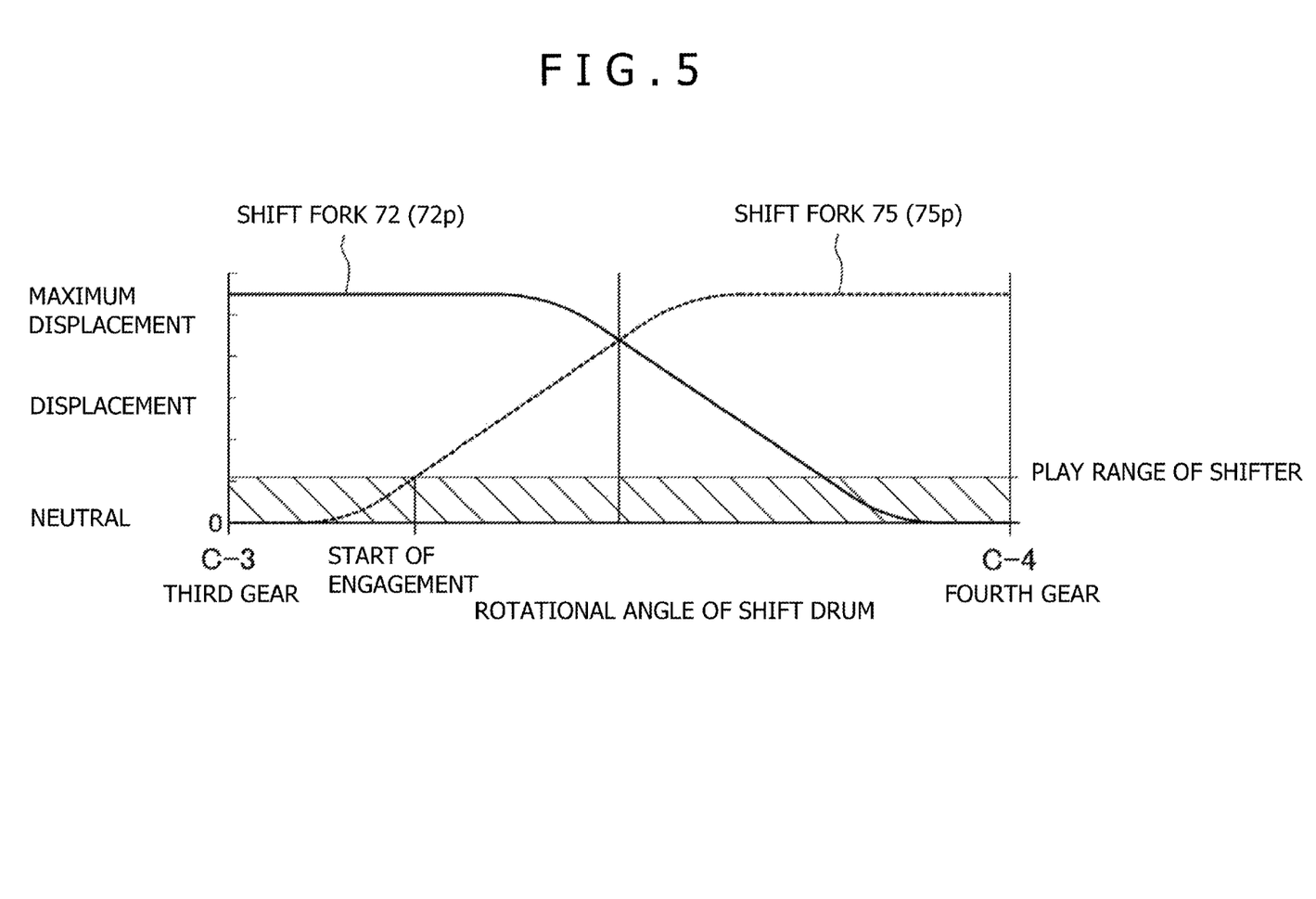
FIG. 5 is a diagram showing variations in displacement of a shift fork at the time of an upshift from a third gear to a fourth gear.

FIG. 5 shows, as an example, movements of the shift fork 72 (the pin portion 72p thereof) and the shift fork 75 (the pin portion 75p thereof) at the time of an upshift from the third gear to the fourth gear for gear position shift.

The axis of abscissas represents rotational angle of the shift drum 61, ranging from the third-speed rotational angle C-3 to the fourth-speed rotational angle C-4, and the axis of ordinates represents displacement of the shift forks from a neutral position in the axial direction.

The solid line indicates displacement of the pin portion 72p of the shift fork 72, while the broken line indicates displacement of the pin portion 75p of the shift fork 75.

When the shift drum 61 is rotated from the third-speed rotational angle C-3 where the third-speed gear position is established to the fourth-speed rotational angle C-4, the pin portion 72p of the shift fork 72 (for the fifth-speed driven gear C5) is initially located at a position which is displaced from a neutral position and at which the third-speed gear position is established, as indicated by the solid line. Then, the position of the pin portion 72p does not vary until the shift drum 61 rotates to a position near the midpoint between the rotational angle C-3 and the rotational angle C-4, thereafter the pin portion 72p gradually approaches the neutral position, and eventually reaches the neutral position.

On the other hand, the pin portion 75p of the shift fork 75 (for the sixth-speed driven gear C6) immediately starts moving, as indicated by the broken line, from a neutral position when the shift drum 61 has rotated slightly from the third-speed rotational angle C-3. Then, the position of the pin portion 75p gradually varies, and, around the time when the shift drum 61 has passed the midpoint between the rotational angle C-3 and the rotational angle C-4, the pin portion 75p has already been displaced to a position for establishing the fourth-speed gear position.

When the gear position is shifted from the third-speed gear position to the fourth-speed gear position, the shift fork 72 and the shift fork 75 are moved as above-mentioned. In the transmission 20, therefore, during the time in which the fifth-speed driven gear C5 (a shifter gear) is engaged with the third-speed driven gear C3 and the third-speed gear position is being established, the sixth-speed driven gear C6 (a shifter gear) starts sliding leftward from a neutral position. Then, after exceeding a play range of the shifter gear, the sixth-speed driven gear C6 starts engaging with the fourth-speed driven gear C4. Thereafter, the fourth-speed gear position is established, and the fifth-speed driven gear C5 and the third-speed driven gear C3 are gradually disengaged from each other.

Figure 6:
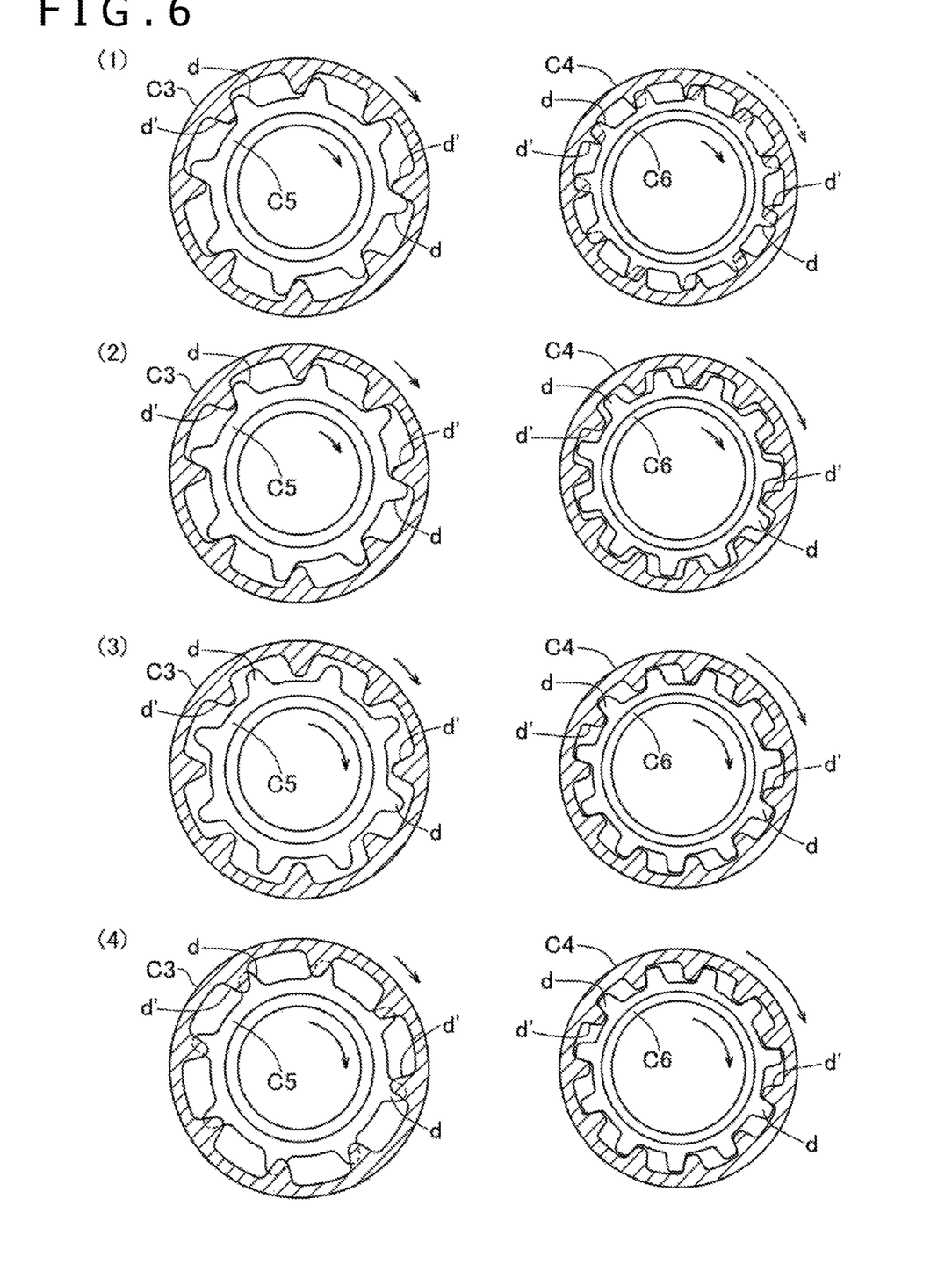
FIG. 6 illustrates changes in an engaged/disengaged state between a shifter gear and a transmission gear at the time of the upshift from the third gear to the fourth gear, with the lapse of time.

Referring to FIG. 6, a shift from the third gear to the fourth gear will be described specifically below, together with a control of operation of the pair of the transmission clutches 40A and 40B forming the twin clutch 40, executed at the time of shifting the gear position from the third-speed gear position to the fourth-speed gear position.

FIG. 6 illustrates changes in an engaged/disengaged state between the dog teeth d of the fifth-speed driven gear C5 (a shifter gear) and the dog teeth d' of the third-speed driven gear C3, and changes in an engaged/disengaged state between the dog teeth d of the sixth-speed driven gear C6 (a shifter gear) and the dog teeth d' of the fourth-speed driven gear C4, with the lapse of time.

Note that FIG. 6 depicts schematic illustrations of the counter shaft 22 as viewed from the right side in the axial direction.

First, when the third-speed gear position is being established, the first transmission clutch 40A is in an engaged state, for transmitting power to the main-shaft inner shaft 41A to thereby rotate the third-speed driving gear M3 meshing with the third-speed driven gear C3. As depicted in FIG. 6(1), the third-speed driven gear C3 is rotating the fifth-speed driven gear C5 together with the counter shaft 22 at the third gear speed, through the engagement between the dog teeth d and the dog teeth d'.

At this time, the dog teeth d of the sixth-speed driven gear C6 and the dog teeth d' of the fourth-speed driven gear C4 are not in engagement with each other (see FIG. 6(1)).

Then, when a shift command for shifting to the fourth gear is given, the second transmission clutch 40B forming the twin clutch 40 is engaged to transmit power to the main-shaft outer shaft 41B, thereby rotating the fourth-speed driving gear M4, whereby the fourth-speed driven gear C4 meshing with the fourth-speed driving gear M4 is driven to rotate at a fourth gear speed (see FIG. 6(2)).

Next, while the fifth-speed driven gear C5 is in engagement with the third-speed driven gear C3 to maintain the third-speed gear position, the sixth-speed driven gear C6 starts sliding leftward from the neutral position, whereby the dog teeth d of the sixth-speed driven gear C6 rotating at a third gear speed through the counter shaft 22 are engaged with the dog teeth d' of the fourth-speed driven gear C4 rotating at a fourth gear speed (see FIG. 6(3)).

A contact shock due to this engagement between the dog teeth d of the sixth-speed driven gear C6 and the dog teeth d' of the fourth-speed driven gear C4, which are rotating at different rotational speeds, is transmitted through the counter shaft 22 to the fifth-speed driven gear C5, whereby engagement between the fifth-speed driven gear C5 and the third-speed driven gear C3 is loosened.

Subsequently, the dog teeth d of the fifth-speed driven gear C5 are disengaged from the dog teeth d' of the third-speed driven gear C3. In this case, since the engagement between the dog teeth d and the dog teeth d' has preliminarily been loosened, the disengagement is easily achieved (see FIG. 6(4)).

In this instance, the fourth-speed gear position has already been established.

Thereafter, the first clutch 40A of the twin clutch 40 is disengaged.

In this way, at the time of an upshift from the third gear to the fourth gear, the shift fork 72 and the shift fork 75 are moved in pair to operate the fifth-speed driven gear C5 and the sixth-speed driven gear C6, which are shifter gears. While the fifth-speed driven gear C5 is in engagement with the third-speed driven gear C3 to maintain the third-speed gear position, the second transmission clutch 40B is put into an engaged state, whereby the sixth-speed driven gear C6 is engaged preliminarily with the fourth-speed driven gear C4. Thereafter, the third-speed driven gear C3 and the fifth-speed driven gear C5 can be easily disengaged from each other.

In other words, the third-speed driven gear C3 and the fifth-speed driven gear C5 can be smoothly disengaged from each other, without preliminarily disengaging the first transmission clutch 40A. Consequently, the upshift from the third gear to the fourth gear can be achieved more smoothly and swiftly.

The above-described control of operation of the pair of the transmission clutches 40A and 40B is conducted by a control unit CU shown in FIG. 1, which control unit CU is connected, for its operation, to a gear-position-shifting manual tool T to be manipulated by the vehicle driver for gear position shift. As mentioned hereinabove, the first clutch actuator 57A (FIG. 1) supplies hydraulic oil through the first control oil hole 55A to the first transmission clutch 40A, and the second clutch actuator 57B (FIG. 1) supplies hydraulic oil through the second control oil hole 55B to the second transmission clutch 40B. The control unit CU, upon input from the gear-position-shifting manual tool T, operates to control the timings of the engagement and disengagement of the first and second transmission clutches 40A and 40B.

As shown in FIG. 3, the control unit CU is connected also to the shift motor 85 of the shift driving mechanism 60 to control the shift motor 85.

Also, at the times of upshifts from the first gear to the second gear, from the second gear to the third gear, from the fourth gear to the fifth gear, and from the fifth gear to the sixth gear, two of the shift forks are moved in pair to operate the relevant shifter gears, whereby the desired shifting of the gear position can be carried out smoothly and swiftly.

Note that this applies also to the cases of downshifts.

Furthermore, even in the case where upshifts or downshifts are performed sequentially and continuously over a plurality of gear positions (for example, in the case where an upshift from the third gear to the sixth gear is desired), the shifts of the gear position can sequentially be performed with both the transmission clutch for the current gear position and the transmission clutch for the next gear position kept in an engaged state, without disengaging the transmission clutches each time of shifting the gear position. Consequently, a smooth and swift shifting to a desired gear position can be achieved.

In this embodiment, the shift drum 61 having the lead grooves 62, 63, 64, and 65 formed in the outer circumferential surface thereof is used in the shift driving mechanism 60. Therefore, engagement and disengagement of the shifter gears with the transmission gears can be performed by a simple-structured shift driving mechanism 60, at appropriate timings and in a reliable manner.

Since the transmission clutches 40A and 40B forming the twin clutch 40 are hydraulic clutches, shocks at the time of engagement of the shifter gear with the transmission gear can be absorbed, so that the engaging noise can be reduced.

While the transmission system for a vehicle according to one embodiment of the present invention has been described above, the mode for carrying out the invention is not limited to the above embodiment, and various modes of carrying out the invention are included in the scope of the gist of the invention.

DESCRIPTION OF REFERENCE SYMBOLS

1 . . . Internal combustion engine, 2 . . . Crankcase, 3 . . . Cylinder block, 4 . . . Cylinder head, 5 . . . Cylinder head cover, 6 . . . Oil pan, 7 . . . Right crankcase cover; 10 . . . Crankshaft, 20 . . . Transmission, 21 . . . Main shaft, 21A . . . Main-shaft inner shaft, 21B . . . Main-shaft outer shaft, 21C . . . Clutch-section outer shaft, 22 . . . Counter shaft, 25 to 27 . . . Bearing, 28, 29 . . . Needle bearing, 30 . . . C-shaped stop ring, 31 . . . Annular spacer; 40 . . . Twin clutch, 40A . . . First transmission clutch, 40B . . . Second transmission clutch, 41 . . . Clutch hub, 42a, 42b . . . Clutch outer member, 43a, 43b . . . Clutch inner member, 44 . . . Driving friction disc, 45 . . . Driven friction disc, 46 . . . Friction disc group, 47a, 47b . . . Pressure plate, 48 . . . C-shaped stop ring, 49a, 49b . . . Spring retainer, 50 . . . C-shaped stop ring, 51a, 51b . . . Clutch spring, 52A, 52B . . . Control oil pressure chamber, 53A, 53B . . . Canceler oil chamber, 55A . . . First control oil hole, 55B . . . Second control oil hole, 56A . . . First control oil passage, 56B . . . Second control oil passage, 57A . . . First clutch actuator, 57B . . . Second clutch actuator; 60 . . . Shift driving mechanism, 61 . . . Shift drum, 62, 63, 64, 65 . . . Lead groove, 66, 67 . . . Bearing, 70, 71 . . . Shift fork shaft, 72, 73, 74, 75 . . . Shift fork, 80 . . . Intermittent feeding mechanism, 81 . . . Shift spindle, 82 . . . Master arm, 85 . . . Shift motor, 86 . . . Speed reduction gear mechanism, CU . . . Control unit, T . . . Gear-position-shifting manual tool.

The invention claimed is:

1. A transmission system for a vehicle, comprising:
a transmission in which a plurality of driving transmission gears supported on a driving transmission shaft and a plurality of driven transmission gears supported on a driven transmission shaft are meshed on a gear position basis, and shifters supported on at least one transmission shaft out of the driving transmission shaft and the driven transmission shaft are movable in an axial direction of the transmission shaft for engagement with the transmission gears rotatably supported on the one transmission shaft to thereby enable transmission of power;
a shift driving mechanism for moving the shifters to thereby shift a gear position of the transmission; and
a plurality of transmission clutches for establishing and interrupting transmission of power from a drive source to the driving transmission shaft;
wherein, for shifting the gear position, the shift driving mechanism and the plurality of transmission clutches are under control of a control unit operated by gear position shifting operation to disengage a shifter and a transmission gear of a current gear position from each other after engaging a shifter and a transmission gear of a next gear position with each other, with one of the transmission clutches for transmitting power to the transmission gear of the next gear position being in an engaged state, and
wherein, at the time of shifting the gear position, while one of the plurality of transmission clutches that transmits power to the transmission gear of the current gear position is kept in an engaged state, another of the plurality of transmission clutches that transmits power to the transmission gear of the next gear position is concurrently engaged.

2. The transmission system for a vehicle according to claim 1, wherein:
the shift driving mechanism comprises a rotatable shift drum having lead grooves formed in an outer circumferential surface thereof, and shift forks movable in an axial direction of the shift drum while being guided by lead grooves, the shift forks being in engagement with the shifters, respectively, to shift the shifters and being sequentially movable, always in a pair, in an upshift direction or a downshift direction to thereby shift the gear position; and
the shift drum is formed in such a manner that a starting timing of shifting set by the lead groove for a next gear position is earlier than a starting timing of shifting set by the lead groove for a current gear position.

3. The transmission system for a vehicle according to claim 1, wherein:
each of the plurality of transmission clutches is provided for each gear position or for each of gear position groups; and
at the time of shifting the gear position, while the one of the plurality of transmission clutches which has been transmitting power to the transmission gear of the current gear position is kept in the engaged state, the other of the plurality of transmission clutches which is to transmit power to the transmission gear of the next gear position is concurrently engaged.

4. The transmission system for a vehicle according to claim 3, wherein:
the plurality of transmission clutches are provided respectively for two groups consisting of a group of odd-numbered gear positions and a group of even-numbered gear positions.

5. The transmission system for a vehicle according to claim 1, wherein the plurality of transmission clutches are capable of capacity control.

6. The transmission system for a vehicle according to claim 2, wherein:
each of the plurality of transmission clutches is provided for each gear position or for each of gear position groups; and
at the time of shifting the gear position, while the one of the plurality of transmission clutches which has been transmitting power to the transmission gear of the current gear position is kept in the engaged state, the other of the plurality of transmission clutches which is to transmit power to the transmission gear of the next gear position is concurrently engaged.

7. The transmission system for a vehicle according to claim 6, wherein:
the plurality of transmission clutches are provided respectively for two groups consisting of a group of odd-numbered gear positions and a group of even-numbered gear positions.

8. The transmission system for a vehicle according to claim 2, wherein the plurality of transmission clutches are capable of capacity control.

9. The transmission system for a vehicle according to claim 3, wherein the plurality of transmission clutches are capable of capacity control.

10. The transmission system for a vehicle according to claim 6, wherein the plurality of transmission clutches are capable of capacity control.

11. The transmission system for a vehicle according to claim 4, wherein the plurality of transmission clutches are capable of capacity control.

12. The transmission system for a vehicle according to claim 7, wherein the plurality of transmission clutches are capable of capacity control.

* * * * *